United States Patent
Nicholson

(10) Patent No.: US 10,528,967 B2
(45) Date of Patent: Jan. 7, 2020

(54) SYSTEM AND METHOD FOR DISCOUNTING FUEL

(71) Applicant: Excentus Corporation, Dallas, TX (US)

(72) Inventor: G. Randy Nicholson, Abilene, TX (US)

(73) Assignee: Excentus Corporation, Dallas, TX (US)

( * ) Notice: Subject to any disclaimer, the term of this patent is extended or adjusted under 35 U.S.C. 154(b) by 208 days.

(21) Appl. No.: 14/498,171

(22) Filed: Sep. 26, 2014

(65) Prior Publication Data

US 2015/0012347 A1 Jan. 8, 2015

Related U.S. Application Data

(60) Continuation of application No. 12/080,184, filed on Apr. 1, 2008, now abandoned, which is a division of
(Continued)

(51) Int. Cl.
*G06Q 30/02* (2012.01)
*G06Q 20/18* (2012.01)
(Continued)

(52) U.S. Cl.
CPC ......... *G06Q 30/0227* (2013.01); *G06Q 20/18* (2013.01); *G06Q 20/20* (2013.01);
(Continued)

(58) Field of Classification Search
USPC .......................... 705/14.36, 14.25; 235/375
See application file for complete search history.

(56) References Cited

U.S. PATENT DOCUMENTS 3,852,576 A 12/1974 Rudd
3,931,497 A 1/1976 Gentile et al.
(Continued)

FOREIGN PATENT DOCUMENTS

CA 1234632 3/1988
EP 0 356 243 2/1990
(Continued)

OTHER PUBLICATIONS

U.S. Appl. No. 60/184,185.
(Continued)

*Primary Examiner* — Afaf Osman Bilal Ahmed
(74) *Attorney, Agent, or Firm* — Norton Rose Fulbright US LLP

(57) ABSTRACT

A system and method of discounting a price-per-unit (PPU) of fuel during a fueling transaction by a customer at a fuel merchant. In one aspect, the invention identifies an issuer of the customer's credit card, associates the issuer with a PPU discount for the fuel, and discounts the posted PPU by an amount equal to the PPU discount associated with the identified credit card issuer. In another aspect, the invention determines that the customer participates in a reward program with a vendor with whom the fuel merchant has a relationship agreement for providing PPU discounts for fuel in exchange for redeemed reward points from the reward program. The customer's reward points are converted to a PPU discount, and the posted PPU of the fuel is discounted accordingly.

5 Claims, 4 Drawing Sheets

Related U.S. Application Data application No. 11/158,674, filed on Jun. 22, 2005, now Pat. No. 7,742,942.

(51) Int. Cl.
*G06Q 20/20* (2012.01)
*G06Q 20/24* (2012.01)
*G06Q 30/06* (2012.01)
*G06Q 50/06* (2012.01)

(52) U.S. Cl.
CPC .............. *G06Q 20/24* (2013.01); *G06Q 30/02* (2013.01); *G06Q 30/0207* (2013.01); *G06Q 30/0226* (2013.01); *G06Q 30/0232* (2013.01); *G06Q 30/0236* (2013.01); *G06Q 30/0238* (2013.01); *G06Q 30/0239* (2013.01); *G06Q 30/06* (2013.01); *G06Q 50/06* (2013.01)

(56) References Cited

U.S. PATENT DOCUMENTS

| | | | |
|---|---|---|---|
| 4,723,212 | A | 2/1988 | Mindrum et al. |
| 4,821,186 | A | 4/1989 | Munakata et al. |
| 4,825,045 | A | 4/1989 | Humble |
| 4,910,672 | A | 3/1990 | Off et al. |
| 4,949,256 | A | 8/1990 | Humble et al. |
| 5,008,519 | A | 4/1991 | Cunningham et al. |
| 5,025,372 | A | 6/1991 | Burton et al. |
| 5,056,019 | A | 10/1991 | Schultz et al. |
| 5,132,521 | A | 7/1992 | Smith et al. |
| 5,173,851 | A | 12/1992 | Off et al. |
| 5,185,695 | A | 2/1993 | Pruchnicki |
| 5,200,889 | A | 4/1993 | Mori |
| 5,202,826 | A | 4/1993 | McCarthy |
| 5,299,135 | A | 3/1994 | Lieto et al. |
| 5,340,969 | A | 8/1994 | Cox |
| 5,368,129 | A | 11/1994 | Kohorn |
| 5,420,606 | A | 5/1995 | Begum et al. |
| 5,466,919 | A | 11/1995 | Hovakimian |
| 5,481,094 | A | 1/1996 | Suda et al. |
| 5,483,049 | A | 1/1996 | Schulze, Jr. |
| 5,502,636 | A | 3/1996 | Clarke |
| 5,612,868 | A | 3/1997 | Off et al. |
| 5,689,100 | A | 11/1997 | Carrithers et al. |
| 5,700,999 | A | 12/1997 | Streicher et al. |
| 5,710,886 | A | 1/1998 | Christensen et al. |
| 5,797,470 | A | 8/1998 | Bohnert et al. |
| 5,806,045 | A | 9/1998 | Biorge et al. |
| 5,822,735 | A | 10/1998 | De Lapa et al. |
| 5,832,457 | A | 11/1998 | O'Brien et al. |
| 5,862,222 | A | 1/1999 | Gunnarsson |
| 5,895,457 | A | 4/1999 | Kurowski et al. |
| 5,901,303 | A | 5/1999 | Chew |
| 5,905,246 | A | 5/1999 | Fajkowski |
| 5,923,016 | A | 7/1999 | Fredregill et al. |
| 5,945,653 | A | 8/1999 | Walker et al. |
| 6,000,608 | A | 12/1999 | Dorf |
| 6,032,136 | A | 2/2000 | Brake, Jr. et al. |
| 6,032,138 | A | 2/2000 | McFiggans et al. |
| 6,073,840 | A | 6/2000 | Marion |
| 6,076,068 | A | 6/2000 | DeLapa et al. |
| 6,089,284 | A | 7/2000 | Kaehler et al. |
| 6,098,879 | A | 8/2000 | Terranova |
| 6,112,981 | A | 9/2000 | McCall |
| 6,152,591 | A | 11/2000 | McCall et al. |
| 6,189,787 | B1 | 2/2001 | Dorf |
| 6,193,154 | B1 | 2/2001 | Phillips et al. |
| 6,243,688 | B1 | 6/2001 | Kalina |
| 6,263,319 | B1 | 7/2001 | Leatherman |
| 6,292,786 | B1 | 9/2001 | Deaton et al. |
| 6,298,329 | B1 | 10/2001 | Walker et al. |
| 6,321,984 | B1 | 11/2001 | McCall et al. |
| 6,332,126 | B1 * | 12/2001 | Peirce .................... G06Q 30/02 705/14.25 |
| 6,332,128 | B1 * | 12/2001 | Nicholson .............. G06Q 30/02 235/375 |
| 6,450,407 | B1 | 9/2002 | Freeman et al. |
| 6,594,640 | B1 | 7/2003 | Postrel |
| 6,741,968 | B2 * | 5/2004 | Jacoves ................ G06Q 20/023 235/375 |
| 6,778,967 | B1 | 8/2004 | Nicholson |
| 6,813,609 | B2 | 11/2004 | Wilson |
| 6,865,547 | B1 | 3/2005 | Brake, Jr. et al. |
| 6,885,996 | B2 | 4/2005 | Nicholson |
| 6,947,898 | B2 | 9/2005 | Postrel |
| 6,980,960 | B2 | 12/2005 | Hajdukiewicz et al. |
| 6,999,943 | B1 | 2/2006 | Johnson et al. |
| 7,054,830 | B1 | 5/2006 | Eggleston et al. |
| 7,072,864 | B2 | 7/2006 | Brake, Jr. et al. |
| 7,096,190 | B2 | 8/2006 | Postrel |
| 7,263,507 | B1 | 8/2007 | Brake, Jr. et al. |
| 7,268,668 | B2 | 9/2007 | Beenau et al. |
| 7,392,224 | B1 | 6/2008 | Bauer et al. |
| 7,506,804 | B2 | 3/2009 | Zajkowski et al. |
| 7,562,048 | B1 | 7/2009 | Sunde et al. |
| 7,606,730 | B2 | 10/2009 | Antonucci |
| 7,624,040 | B2 | 11/2009 | Postrel |
| 7,624,041 | B2 | 11/2009 | Postrel |
| 7,660,763 | B1 | 2/2010 | Brake, Jr. et al. |
| 7,676,393 | B2 | 3/2010 | Postrel |
| 7,680,687 | B2 | 3/2010 | Postrel |
| 7,680,688 | B2 | 3/2010 | Hessburg et al. |
| 7,686,218 | B2 | 3/2010 | Hessburg et al. |
| 7,707,111 | B2 | 4/2010 | Brake, Jr. et al. |
| 7,716,080 | B2 | 5/2010 | Postrel |
| 7,742,943 | B2 | 6/2010 | Postrel |
| 7,747,524 | B2 | 6/2010 | Brown |
| 7,761,378 | B2 | 7/2010 | Postrel |
| 7,765,124 | B2 | 7/2010 | Postrel |
| 7,769,630 | B2 | 8/2010 | Postrel |
| 7,801,799 | B1 | 9/2010 | Brake, Jr. et al. |
| 7,828,206 | B2 | 11/2010 | Hessburg et al. |
| 8,010,405 | B1 | 8/2011 | Bortolin et al. |
| 8,073,736 | B2 | 12/2011 | Blagg et al. |
| 8,195,507 | B2 | 6/2012 | Postrel |
| 8,285,588 | B2 | 10/2012 | Postrel |
| 8,306,851 | B2 | 11/2012 | Wells et al. |
| 8,317,094 | B2 | 11/2012 | Lehman |
| 8,423,402 | B2 | 4/2013 | Postrel |
| 8,433,608 | B2 | 4/2013 | Bortolin et al. |
| 8,447,650 | B2 | 5/2013 | Postrel |
| 8,452,647 | B2 | 5/2013 | Postrel |
| 8,452,651 | B2 | 5/2013 | Postrel |
| 8,478,638 | B2 | 7/2013 | Postrel |
| 8,478,640 | B2 | 7/2013 | Postrel |
| 8,489,513 | B2 | 7/2013 | Bishop et al. |
| 8,606,631 | B2 | 12/2013 | Blagg |
| 8,612,290 | B2 | 12/2013 | Postrel |
| 8,676,642 | B1 | 3/2014 | Sheley |
| 8,682,791 | B2 | 3/2014 | Bies et al. |
| 8,695,875 | B1 | 4/2014 | Segura |
| 8,701,989 | B2 | 4/2014 | Lehman |
| 8,725,564 | B2 | 5/2014 | Postrel |
| 8,738,429 | B2 | 5/2014 | Shepard |
| 8,775,241 | B2 | 7/2014 | Bortolin et al. |
| 8,781,891 | B2 | 7/2014 | Postrel |
| 8,783,561 | B2 | 7/2014 | Wesley |
| 8,799,063 | B2 | 8/2014 | Postrel |
| 8,799,065 | B2 | 8/2014 | Reuthe et al. |
| 8,939,357 | B1 | 1/2015 | Perry |
| 9,038,893 | B2 | 5/2015 | Kirkham |
| 9,135,612 | B1 | 9/2015 | Proctor, Jr. et al. |
| 9,224,154 | B2 | 12/2015 | Wesley |
| 2001/0020198 | A1 | 9/2001 | Wilson |
| 2001/0034651 | A1 | 10/2001 | Marks et al. |
| 2001/0049626 | A1 | 12/2001 | Nicholson |
| 2002/0046117 | A1 | 4/2002 | Marion |
| 2002/0107738 | A1 | 8/2002 | Beach et al. |
| 2002/0143616 | A1 | 10/2002 | Hajdukiewicz et al. |
| 2002/0143619 | A1 | 10/2002 | Laurie |
| 2002/0174012 | A1 | 11/2002 | Litwin |
| 2003/0033154 | A1 | 2/2003 | Hajdukiewicz et al. |
| 2003/0040964 | A1 | 2/2003 | Lacek |
| 2003/0046096 | A1 | 3/2003 | Shah et al. |
| 2003/0106934 | A1 | 6/2003 | McCall et al. |

(56) References Cited

U.S. PATENT DOCUMENTS

| | | | |
|---|---|---|---|
| 2003/0130891 A1* | 7/2003 | Jacobs | G06Q 20/10 705/14.36 |
| 2004/0158493 A1 | 8/2004 | Nicholson | |
| 2004/0220861 A1 | 11/2004 | Morciniec et al. | |
| 2004/0243478 A1 | 12/2004 | Walker et al. | |
| 2004/0249710 A1 | 12/2004 | Smith et al. | |
| 2005/0004839 A1 | 1/2005 | Bakker et al. | |
| 2005/0131761 A1 | 6/2005 | Trika et al. | |
| 2005/0149402 A1 | 7/2005 | Nicholson | |
| 2005/0234776 A1 | 10/2005 | Jacoves et al. | |
| 2005/0234777 A1 | 10/2005 | Bird et al. | |
| 2005/0240527 A1 | 10/2005 | Goldman | |
| 2005/0251440 A1 | 11/2005 | Bednarek | |
| 2005/0267800 A1 | 12/2005 | Tietzen et al. | |
| 2006/0053056 A1 | 3/2006 | Alspach-Goss et al. | |
| 2006/0085252 A1 | 4/2006 | Kersenbrock | |
| 2006/0086787 A1 | 4/2006 | Roy et al. | |
| 2006/0095318 A1 | 5/2006 | Ross et al. | |
| 2006/0095328 A1 | 5/2006 | Ross et al. | |
| 2006/0190331 A1 | 8/2006 | Tollinger et al. | |
| 2006/0271431 A1 | 11/2006 | Wehr et al. | |
| 2006/0293947 A1 | 12/2006 | Nicholson | |
| 2007/0106602 A1 | 5/2007 | Wolters | |
| 2007/0152038 A1 | 7/2007 | Ciancio et al. | |
| 2007/0174126 A1 | 7/2007 | McCall et al. | |
| 2007/0219872 A1 | 9/2007 | Rolf | |
| 2008/0071614 A1 | 3/2008 | Mebruer | |
| 2008/0126208 A1 | 5/2008 | Nicholson et al. | |
| 2008/0189183 A1 | 8/2008 | Nicholson | |
| 2008/0208688 A1 | 8/2008 | Byerley et al. | |
| 2008/0221984 A1 | 9/2008 | Abhyanker | |
| 2008/0262928 A1 | 10/2008 | Michaelis | |
| 2008/0270245 A1 | 10/2008 | Boukadoum et al. | |
| 2009/0030798 A1 | 1/2009 | Otto et al. | |
| 2009/0094158 A1 | 4/2009 | Fein et al. | |
| 2009/0132381 A1 | 5/2009 | Gangi | |
| 2009/0248518 A1 | 10/2009 | Shigematsu | |
| 2009/0307079 A1 | 12/2009 | Martin, Jr. | |
| 2010/0017284 A1 | 1/2010 | Ross et al. | |
| 2010/0094690 A1 | 4/2010 | Beal | |
| 2010/0114683 A1 | 5/2010 | Wessels et al. | |
| 2010/0153205 A1 | 6/2010 | Retter et al. | |
| 2011/0071890 A1 | 3/2011 | Hart et al. | |
| 2011/0087531 A1 | 4/2011 | Winters et al. | |
| 2011/0208576 A1 | 8/2011 | Durgin et al. | |
| 2011/0231321 A1 | 9/2011 | Milne | |
| 2011/0251880 A1 | 10/2011 | Butler et al. | |
| 2011/0264527 A1 | 10/2011 | Fitzpatrick et al. | |
| 2012/0029992 A1 | 2/2012 | De Facendis | |
| 2012/0197705 A1 | 8/2012 | Mesaros | |
| 2013/0046605 A1 | 2/2013 | Baron et al. | |
| 2013/0091001 A1 | 4/2013 | Jia et al. | |
| 2013/0246138 A1 | 9/2013 | Johnson et al. | |
| 2013/0248591 A1 | 9/2013 | Look et al. | |
| 2013/0282468 A1 | 10/2013 | Michael | |
| 2013/0317894 A1 | 11/2013 | Zhu et al. | |
| 2013/0317897 A1 | 11/2013 | Nicholson | |
| 2014/0025518 A1 | 1/2014 | Look | |
| 2015/0287068 A1 | 10/2015 | Porco et al. | |

FOREIGN PATENT DOCUMENTS

| | | |
|---|---|---|
| EP | 0 511 463 | 4/1992 |
| GB | 2274349 | 7/1994 |
| JP | 2217998 | 8/1990 |
| WO | WO-91/18373 | 11/1991 |
| WO | WO-92/14213 | 8/1992 |
| WO | WO-96/06415 | 2/1996 |

OTHER PUBLICATIONS

U.S. Appl. No. 09/249,842.
U.S. Appl. No. 10/320,724.
U.S. Appl. No. 60/082,927, filed Apr. 24, 1998, Jacoves.
U.S. Appl. No. 60/093,813, filed Jul. 23, 1998, Nicholson.
Hisey, Pete, "Storming the Store Card Gates", Jul. 1997, 4 pgs.
Facsimile to Don Krone at Dunigan Fuels dated Jul. 8, 1997, from Arnie Krause at Fleming regarding Fleming/CFG Petroleum Marketing Plan dated Jul. 2, 1997, 20 pages.
Affidavit of G. Randy Nicholson dated Dec. 18, 2008, 44 pages.
Shockey, Don, "Automated Pumps New Krown Jewel," The Sunday Oklahoman, Feb. 26, 1989, 1 page.
Braykovich, Mark, "Want Gas? Biggs Sells That Too," The Cincinnati Enquirer, Oct. 4, 1989, 1 page.
Financial Marketing Consultants, Inc. presentation regarding Krown Systems, 4 pages.
Affidavit of Don Krone dated Apr. 27, 2006, 37 pages.
Fuel Incentives External Design Specification, Revision 2, Sep. 22, 1999, Catalina Marketing Corporation, 9 pages.
Grocery Fuel System Installation Manual, Convenient Fuel Group, Version .01, Aug. 1, 1998, 20 pages.
"CFG and Gilbarco," Gilbarco Press Release, Feb. 25, 1999, 2 pages.
"Profit Center 2000 The In-Store marketing program is the competitive advantage," CFG (Convenient Fuel Group), 8 pages.
Convenient Fuels Group System Operation Manual, Version 01, May 10, 1998, 18 pages.
USPTO Disclosure Document dated Apr. 27, 1998, 6 pages.
Krone, Donald et al., "Apparatus for Control and Reporting of Motor Fuel Sales," draft utility patent application, dated Aug. 5, 1998, 15 pages.
Ivanovich, David, "Exxon-GE MasterCard to Feature Rebates on Gasoline," Houston Chronicle: Sep. 15, 1994, 1 pg.
Weaver, Peter., "Debit-card use growing fast," Nation's Business v. 83, No. 3, pp. 59, Mar. 1995, Dialog File 15, Record #00994494, 96-43884, 1 page.
"Value in Action", Canadian Tire Corporation Limited,1992 Annual Report, 21 pages.
Summerfield, Patti, "Canadian Tire Strategy", Brunico Communications, Inc., Mar. 8, 1993, 10 pages.
Allossery, Patrick "Can Tire Launches Loyalty Program", Brunico Communications, Inc., Mar. 7, 1994, 1 page.
Wylie, Ian, "Tesco Loyalty Move Fuels Petrol Price War; The Forecourts Battle Has Been Stepped Up by a Supermarket", The Guardian Money Page, p. 3, Mar. 16, 1996, 2 pages.
"Sainsbury's cuts the cost of motoring", Origin Universal News Services Limited, Jan. 11, 1995, 1 page.
Pandya, Nick, "Sainsbury in Card Counter-Attack", The Guardian City Page, p. 31, Nov. 4, 1995, 2 pages.
Simms, Maurice, "Report on Data Base Marketing; Retailers Pin Hope on Marketing Skill; Loyalty Programs/Zellers, Canadian Tire Set Standard for Looming Battle with Wal-Mart", The Globe and Mail, Feb. 15, 1994, 3 pages.
Morton, Ian, "ASDA Hots Up Petrol War With Voucher Bonus", Associated Newspapers, Ltd. Evening Standard (London), Feb. 24, 1995, ), 1 page.
Kidd, Kenneth, "Giant Retailer Hopes to Buy 300 Gas Bars", Toronto Star Newspapers, Ltd., The Toronto Star, Feb. 17, 1989, 3 pages.
"Texas Cardholders Get Cash Discounts At Exxon Stations Around Country", American Banker, Oct. 31, 1986 p. 12, Dialog(R) File 160: Gale Group Promt(R) Record # 01494997, 1 page.
Paustian, Chuck, "Debit gets rewards", Credit Card Management v. 14 n11 pp. 41 Jan. 2002 Dialog(r) file 15: abi/inform (r) #02296503, 1 Page.
Swift King, Amanda, et al., "The Decision Between Debit and Credit: Finance Charges, Float, and Fear," Financial Services Review, v. 14, n1, p. 21 Mar. 2005 Diaolog(R)File 9: Business & Industry (R) record # 04025835, 16 pages.
Kingson, Jennifer A., "With Debit Push, B of A Goes Against the Grain", American Banker, 169, 103 1 May 28, 2004 Dialog(R) File 148: Gale Group Trade & Industry DB Record # 0017057437, 3 pages.
Debit Card Incentives: No Longer Just a Free Loaf of Bread, POS News, Chicago, vol. 9, Issue 1, Jun. 1, 1992, 2 pages.
Turk, Don et al., "EDS' Instant Teller Network Joings Mobil Debit Card System", Electronic Data Systems Corp., Business Newswire,

(56) References Cited

OTHER PUBLICATIONS

0723DE015 Jul. 23, 1990 Dialog(R)File 148: Gale Group Trade & Industry DB Record # 04766283, 2 pages.

Francella, Barbara Grondin, "Anybody's Fuel", Convenienve Store News, p. 31, Jul. 7, 1997, 9 pages.

"Grocery-Gas Combo Opened by Nexus Fuel, 2,000 Planned in Five Years", The Food Institute Report, v70, n32, Aug. 11, 1997, 2 pages.

Callanan, John, "New Realities in Gasoline Marketing", Convenience Store News, p. 50, Dec. 15, 1997, 2 pages.

"Midland's Subsidiary, Arcon Energy, Inc. Sets Up a New Division", Business Wire, p. 04071444, Apr. 3, 1998, 2 pages.

Womack, Phil, "Regulations Changing Fuel Management Options", Baton Rouge Business Report, v10, n12, p. 21(3), Jan. 28, 1992, 3 pages.

Roberts, Ginger, "US-Tower Records Launches Cross Promotion", Billboard (BBD), Searh Report, p. 44, Feb. 20, 1993, 1 page.

Roberts, Ginger, "Sony and Coca-Cola in Cross-Promo Link-up", Billboard (BBD), Search Report, p. 4, 79, Mar. 16, 1991, 1 page.

Jackson, Estelle, "Area Oil Firms Offer Plans for Guaranteed Prices", Richmond Times-Dispatch, City Section: Business, p. E-1, Jul. 14, 1991, 3 pages.

"Esso Animates," Globe & Mail, Canada, Sep. 16, 1998, p. B31.

Gonderinger, L., "Grocery Adds Gas Pumps Albertson's Putting Minimarts in Supermarket Parking Lots", Arizona Republic, Oct. 29, 1998, p. D1.

Gonderinger, L., "Albertson's Puts Gas Pumps in Phoenix Supermarket's Parking Lot," KRTBN Knight-Ridder Tribune Business News (Arizona Republic), Oct. 29, 1998.

Unpublished U.S. Appl. No. 12/832,788 to Perry et al., filed Jul. 8, 2010 and entitled "Systems and Methods for Redeeming E-Coupons."

Gulfree Miles: abstract and search history for the article "Gulf Oil: Pumping up Sales," Incentive Managing and Marketing Through Motivation, v 164, n4, p. 115-116, Apr. 1990.

\* cited by examiner

SYSTEM AND METHOD FOR DISCOUNTING FUEL

CROSS-REFERENCE TO RELATED APPLICATIONS

The present application claims priority to and is a continuation of U.S. patent application Ser. No. 12/080,184, entitled "SYSTEM AND METHOD FOR DISCOUNTING FUEL," filed Apr. 1, 2008, which claims priority to and is a divisional application of U.S. patent application Ser. No. 11/158,674, now U.S. Pat. No. 7,742,942, entitled "SYSTEM AND METHOD FOR DISCOUNTING FUEL," filed Jun. 22, 2005, the disclosures of which are incorporated herein by reference in their entirety.

TECHNICAL FIELD

This invention relates to automated retail systems and methods. More particularly, and not by way of limitation, the invention is directed to a system and method for discounting the price-per-unit (PPU) of fuel at a fuel merchant.

BACKGROUND OF THE INVENTION

Vendors of various products often find it desirable to enter into cross-marketing agreements in which the purchase of a product from a first vendor earns a discount coupon for the consumer on a product from a second vendor. As used herein, the term "vendor" refers to the manufacturer of a specific product or the supplier of specific services. The term "merchant" refers to the store where the products are purchased, such as grocery stores, convenience stores, gasoline service stations, unattended fueling stations, and the like.

The issuers of credit and debit cards also have programs to encourage consumers to utilize the issuer's cards when making purchases. Conventionally, these programs have consisted of giveaways of promotional merchandise, low interest rates on unpaid balances and balance transfers from other cards, and cash back at the end of the year (usually 1-2 percent) on purchases made throughout the year. Some manufacturers such as automobile manufacturers have established affinity-type relationships with card issuers to issue credit cards with manufacturer's logo on the face of the card. Use of such cards results in cash back awards good only on purchases of the associated manufacturers' products. Similarly, some retailers have established affinity-type relationships with card issuers to issue credit cards with a retailer's logo on the face of the card. Use of such cards results in cash back awards good only on purchases within the associated retailer's stores. The manufacturers' programs and the retailers' programs are generally less effective than conventional cash back programs because of the limitations placed on use of the cash back award.

With existing affinity-type relationships, the reward does not occur at the time or point of purchase. Instead, the reward is posted to the customer's credit card account and appears on the customer's monthly account statement. The reward may appear as a monetary credit, or may appear as points, which the customer can redeem when the cumulative total surpasses defined threshold levels. Thus, the reward is not immediate, and the customer must take additional steps to redeem the reward.

A very popular affinity-type reward program provides frequent flyer airline miles as a reward for using a particular credit card. However, there are several problems with this program. For some people, it may take months or even years to reach an award level. Until that time, their accumulated miles are worthless. Other people have trouble redeeming their miles because they fly only at holiday times, and the airlines often have "blackout periods" during the holidays, during which frequent flyer miles are not redeemable.

What is needed in the art is a promotional program for credit cards that overcomes the disadvantages of existing programs while increasing sales of a cross-marketed product such as fuel. The present invention provides such a program.

BRIEF SUMMARY OF THE INVENTION

In one aspect, the present invention is a computer-implemented method of discounting a price-per-unit (PPU) of fuel at a fuel merchant. The method includes reading a customer's credit or debit card number to begin a fueling transaction at the fuel merchant; identifying an issuer of the card by analyzing the card number; associating the identified issuer of the card with a PPU discount for the fuel; discounting a PPU of the fuel posted on the fuel dispenser by an amount equal to the PPU discount associated with the identified issuer of the credit or debit card; and dispensing fuel to the customer at the discounted PPU. In a further sense, the invention also includes a settlement process in which the value of the discount provided by the fueling merchant is calculated and allocated between the fueling merchant and the issuer of the credit or debit card.

In another aspect, the present invention is a system for discounting a PPU of fuel at a fuel merchant. The system includes an island card reader in a fuel dispenser for reading a customer's credit or debit card number to begin a fueling transaction at the fuel merchant; means for identifying an issuer of the card by analyzing the card number; a relationship database for associating the identified issuer of the credit or debit card with a PPU discount for the fuel; and a dispenser controller for retrieving the PPU discount from the relationship database and discounting a PPU of the fuel posted on the fuel dispenser by an amount equal to the retrieved PPU discount. The system may also include a settlement mechanism that calculates the value of the discount provided by the fueling merchant and allocates the discount between the fueling merchant and the issuer of the credit or debit card.

In yet another aspect, the present invention is a computer-implemented method of discounting a PPU of fuel during a fueling transaction by a customer at a fueling merchant. The method includes reading the customer's credit or debit card number to begin the fueling transaction; identifying the customer by analyzing the card number; and determining that the identified customer participates in a reward program with a vendor with whom the fuel merchant has a relationship agreement for providing PPU discounts for fuel in exchange for redeemed reward points from the vendor's reward program. The method also includes exchanging at least a portion of the customer's reward points for a PPU discount for fuel at a predefined exchange rate associated with the vendor; discounting the PPU of the fuel posted on the fuel dispenser by an amount equal to the PPU discount; and dispensing fuel to the customer at the discounted PPU. In a further sense, the invention also includes a settlement process in which the value of the discount provided by the fueling merchant is calculated and allocated between the fueling merchant and the vendor.

In yet another aspect, the present invention is a computer-implemented method of discounting a PPU of fuel during a fueling transaction by a customer at a fuel merchant. The method includes reading the customer's credit or debit card number to begin the fueling transaction; identifying the customer by analyzing the card number; and determining that the identified customer participates in a reward program with a reward point host with whom the fuel merchant has a relationship agreement for providing PPU discounts for fuel in exchange for redeemed reward points from the reward program. The method also includes retrieving from the reward point host, information regarding the customer's available reward points; converting the customer's available reward points to a PPU discount for fuel; discounting the PPU of the fuel posted on the fuel dispenser by an amount equal to the PPU discount; and dispensing fuel to the customer at the discounted PPU. In a further sense, the invention also includes a settlement process in which the value of the discount provided by the fueling merchant is calculated and allocated between the fueling merchant and the vendor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF THE INVENTION

Figure 1:
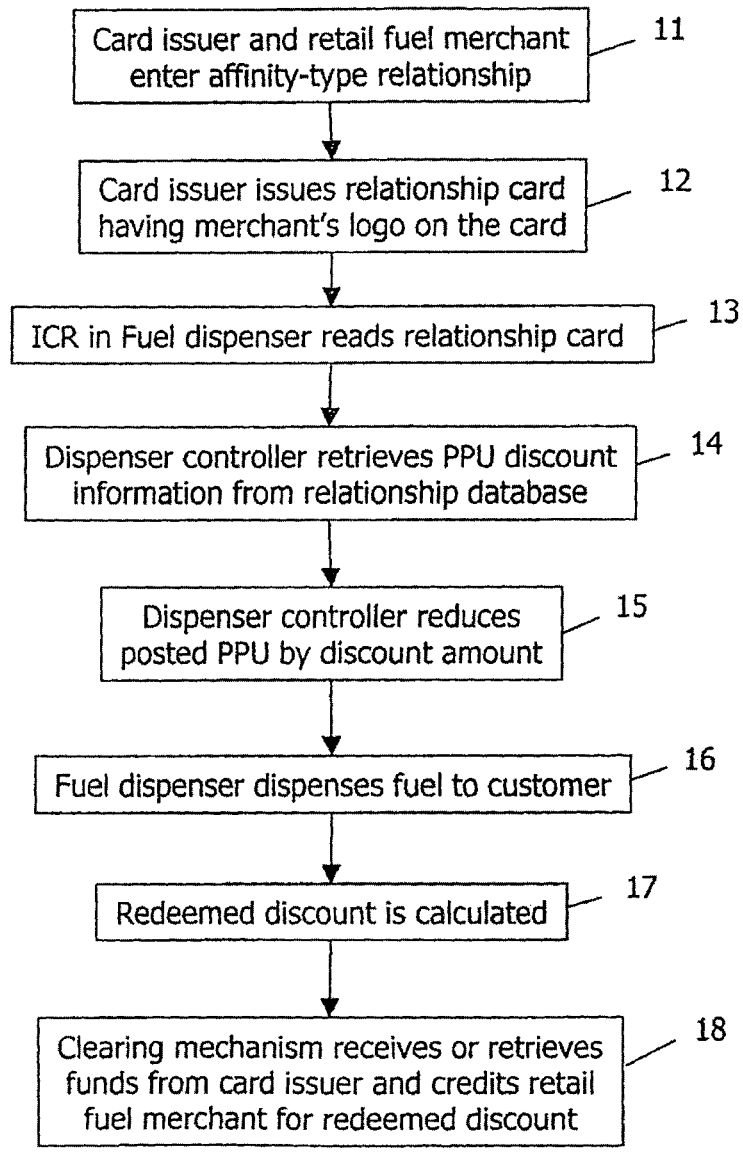
FIG. 1 is a flow chart illustrating the steps of a first embodiment of the method of the present invention.

The present invention is a promotional program for credit, debit, and loyalty cards that overcomes the disadvantages of existing programs while increasing sales of a cross-marketed product such as fuel. In the description herein, financial cards such as credit, debit, and loyalty cards are referred to in the collective as "credit cards".

In one embodiment, the present invention provides a PPU discount for fuel based on the type of credit card or the issuer of the credit card utilized to purchase the fuel. When the card is read at a fuel dispenser or other point-of-sale (POS) terminal at a retail fuel merchant, the Bank Identification Number (BIN) range of the card number may be utilized to identify a specific card issuer such as CitiBank, Wells Fargo, Bank of America, and the like. Other ranges of the card number may be utilized to identify the particular customer and the card brand owner such as Visa, MasterCard, Discover, American Express, and the like. The amount of the PPU discount may be a fixed amount such as ten cents per gallon, or may vary depending on other factors such as the number of times the customer uses the card (or the amount the customer purchases with the card) at the fueling merchant. For example, the first five times the customer uses the card each month at the fueling merchant, the PPU discount is ten cents per gallon. For the sixth through the tenth time the customer uses the card at the fueling merchant in the month, the PPU discount is twenty cents per gallon, and so on. The value of redeemed discounts (i.e., the PPU discount provided to the customer multiplied by the number of gallons purchased) is then allocated between the card issuer, the card brand owner, and the retail fuel merchant in accordance with an agreement between them.

In the preferred embodiment of the present invention, the card issuer enters an agreement with the retail fuel merchant to provide an incentive for customers to use the issuer's card. This may be an affinity-type relationship in which a bank issues the card with an oil company logo on the face of the card. For example, Wells Fargo may issue a relationship card with an Exxon logo on its face. The incentive for customers to use the Wells Fargo relationship card is that they earn an immediate discount on fuel at Exxon stations. A key difference between the inventive affinity-type relationship and existing affinity-type relationships is that the inventive relationship provides an immediate discount at the point of purchase, while existing relationships, as discussed above, provide credits on the customer's credit card statement at a later date, or points that the customer must redeem when—an award level is reached.

When the customer uses the relationship card to purchase fuel at the participating retail fueling station, the dispenser immediately lowers the price-per-gallon displayed on the dispenser. The discount may be a fixed amount such as 10 cents per gallon, or may be a percentage discount, which fluctuates with the posted price of the fuel. For example, if the affinity-type agreement between the bank and the retail fuel merchant recites a five percent discount, and the posted street price of the fuel is $2.00 per gallon, the customer sees the price on the dispenser drop by 10 cents per gallon when the dispenser reads the card. If the posted price is $3.00 per gallon, the customer sees the price drop by 15 cents per gallon when the dispenser reads the card. From the customer's perspective, the transaction is complete when the fuel purchase transaction is completed. No future events or actions on the part of the customer are required to utilize an earned reward.

In the preferred embodiment, a dollar amount of the redeemed discount is calculated by multiplying the PPU discount by the number of units of fuel purchased in the transaction. A clearing mechanism tracks the redeemed discounts, receives or retrieves funds from the card issuer, and credits those funds to the retail fueling station. Thus, the retail fueling station always receives the posted street price for the fueling transaction. The card issuer funds the discounts from its credit card transaction fees.

FIG. 1 is a flow chart illustrating the steps of a first embodiment of the method of the present invention. At step 11, a card issuer and a retail fuel merchant enter into an affinity-type relationship, which offers an immediate discount on the PPU of fuel at the merchant's fueling stations if the customer uses the card issuer's relationship card. At step 12, the card issuer issues a relationship credit card with the merchant's logo on the card. Subsequently, a customer uses the relationship card at one of the merchant's fueling station, and at step 13, the Island Card Reader (ICR) in the fuel dispenser reads the magnetic strip on the relationship card. The card information may also be input by other technologies such as a radio frequency identification (RFID) controller with read/write capability, a contactless smart card reader, an audio recognition device, a biometric recognition device, an optical reader, and the like. The BIN range from the card number is utilized to identify the card issuer, and at step 14 the dispenser controller retrieves an associated PPU discount from a relationship database. The retail fuel merchant may have affinity type relationships with multiple card issuers, and each relationship may specify a different PPU discount level.

At step 15, the dispenser controller reduces the posted PPU of the fuel by the amount of the discount associated with the identified card issuer. At step 16, the fuel is dispensed to the customer at the reduced price. At step 17, the amount of the redeemed discount is calculated by multiplying the PPU discount by the number of units of fuel purchased in the transaction. The redeemed discount may then be stored in a redeemed discount database. At step 18, a clearing mechanism, which interfaces with the redeemed discount database, transfers funds for the amount of the redeemed discount from the card issuer to the retail fuel merchant. Thus, the customer receives an immediate reward; the retail fuel merchant receives the posted street price for the fueling transaction, and the card issuer funds the discount from its credit card transaction fees.

Figure 2:
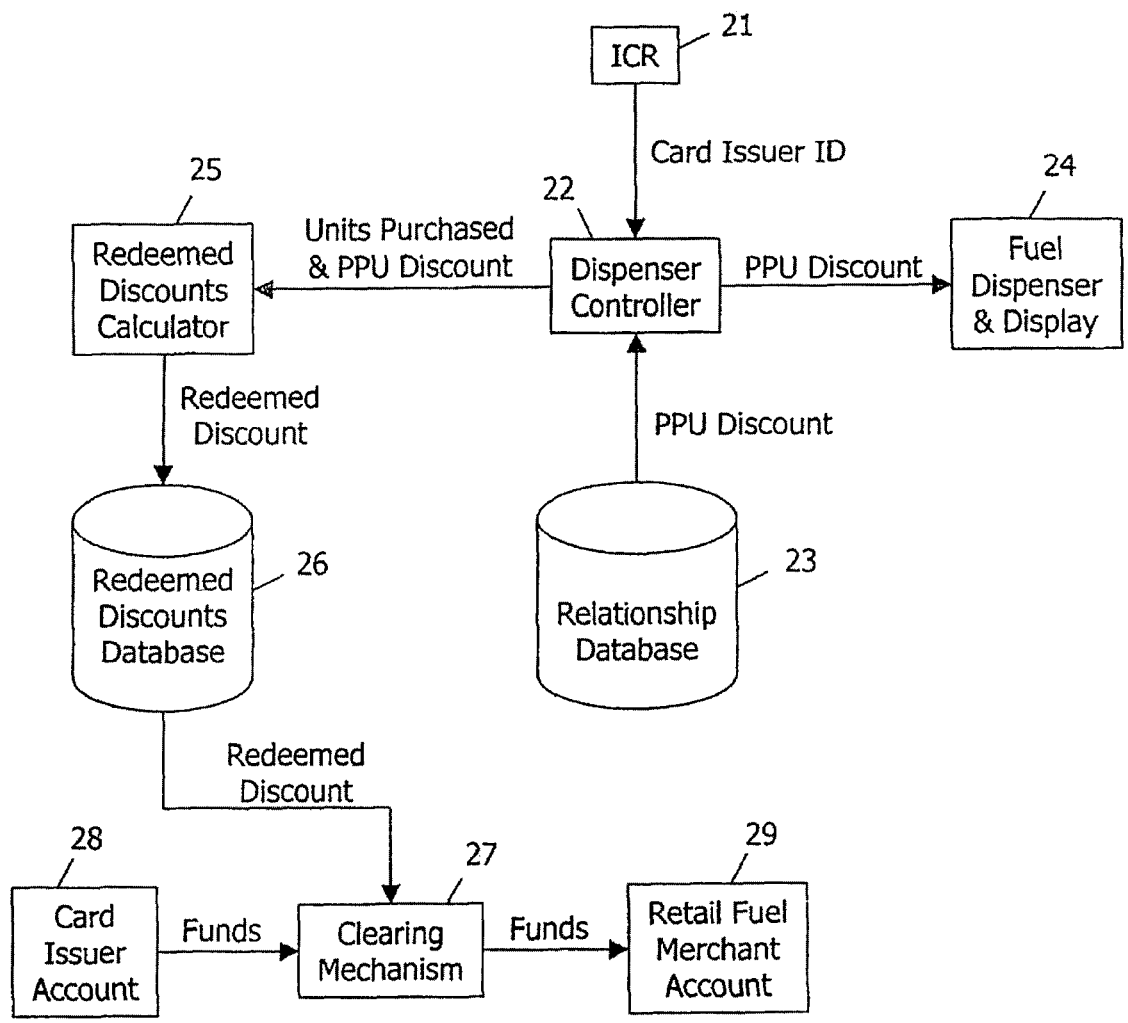
FIG. 2 is a simplified block diagram of a first embodiment of the system of the present invention.

FIG. 2 is a simplified block diagram of a first embodiment of the system of the present invention. When a customer uses a relationship card to purchase fuel at one of the merchant's fueling stations, the Island Card Reader (ICR) 21 in the fuel dispenser (or other input device) reads the relationship card. The BIN range is utilized to identify the card issuer, and a card issuer ID is passed to a dispenser controller 22. Alternatively, the ICR may send the card number to the dispenser controller, and the controller may determine the identification of the card issuer. The dispenser controller uses the card issuer ID to access a relationship database 23 and retrieve an associated PPU discount. The controller then reduces the posted street price on the dispenser display 24 by the amount of the associated PPU discount, and causes the fuel dispenser to dispense the fuel at a discounted price.

When the customer indicates the transaction is complete (for example by replacing the fuel nozzle in its holder), the dispenser controller 22 sends the number of units of fuel purchased and the PPU discount to a redeemed discounts calculator 25. The calculator may be incorporated into the dispenser controller, or may be implemented separately. The calculator preferably calculates the amount of the redeemed discount by multiplying the PPU discount by the number of units of fuel purchased in the transaction. The redeemed discount may then be stored in a redeemed discount database 26 where it is associated with the card issuer and the retail fuel merchant. A clearing mechanism 27 interfaces with the redeemed discount database, and retrieves the redeemed discount and the associated IDs of the card issuer and the retail fuel merchant. The clearing mechanism transfers funds for the amount of the redeemed discount from the card issuer's account 28 to the retail fuel merchant's account 29.

Figure 3:
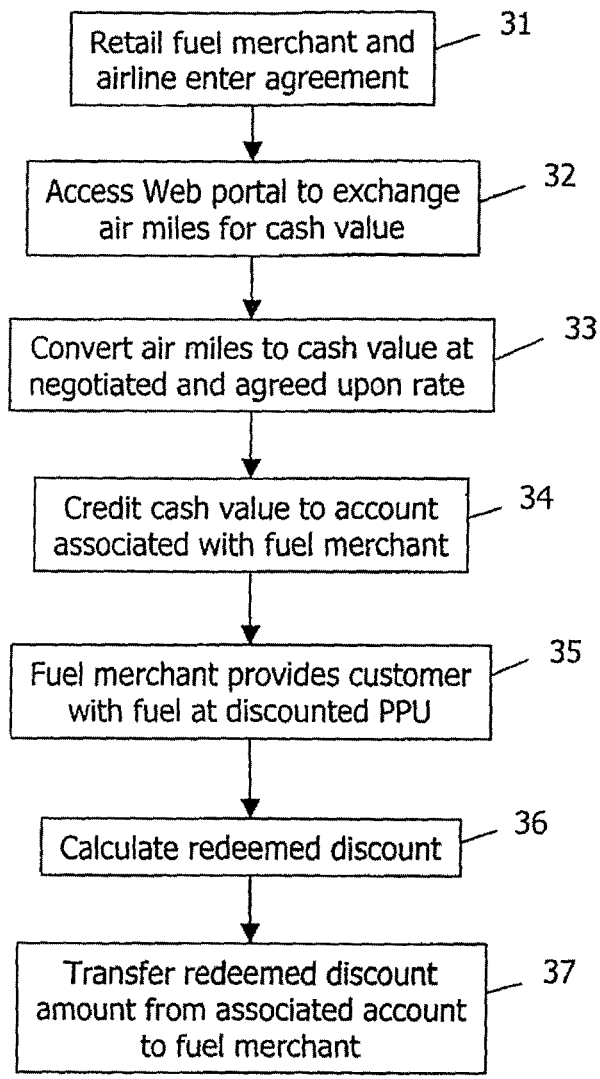
FIG. 3 is a flow chart illustrating the steps of a second embodiment of the method of the present invention.

FIG. 3 is a flow chart illustrating the steps of a second embodiment of the method of the present invention. In this embodiment, an agreement between a retail fuel merchant and a card issuer and/or third party vendor enables customers to use their accumulated reward points or frequent flyer miles as a tender type at a fueling station. Reward points or miles are exchanged for a PPU discount on fuel at a defined exchange rate. In the example illustrated in FIG. 3, a retail fuel merchant and an airline enter an agreement at step 31. The airline has a frequent flyer program that awards air miles to customers who fly on the airline or make other purchases using an affinity-type relationship credit card. At step 32, a Web portal is accessed in order to exchange air miles in the customer's frequent flyer account for a cash value. At step 33, in a so-called "batch transfer" mode of operation, air miles from the customer's frequent flyer account are converted to a promotional cash value at a negotiated and agreed upon exchange rate. At step 34, the promotional cash value is then credited to an account associated with the retail fuel merchant. At step 35, the merchant provides a negotiated and agreed upon PPU discount to the customer in a fueling transaction. At step 36, the amount of the redeemed discount is then calculated by multiplying the PPU discount by the number of units of fuel purchased in the transaction. At step 37, the amount of the redeemed discount is transferred to the retail fuel merchant from the associated account, and the amount of the redeemed discount and the number of miles redeemed is reported to the airline.

Thus, the invention enables a customer to trade in air miles in exchange for a PPU discount, such as a cents-off-per-gallon discount, on fuel at the retail fuel merchant's fueling stations. The retail fuel merchant makes up for most or all of the discount by drawing from the associated account. The airline benefits because more of their customers are motivated to use their affinity-type credit card to generate air miles because they know they can exchange the air miles for fuel discounts. The airline also benefits because their customers are motivated to use their air miles for fuel discounts rather than free airline travel, thus increasing the number of seats available to sell to paying passengers.

Figure 4:
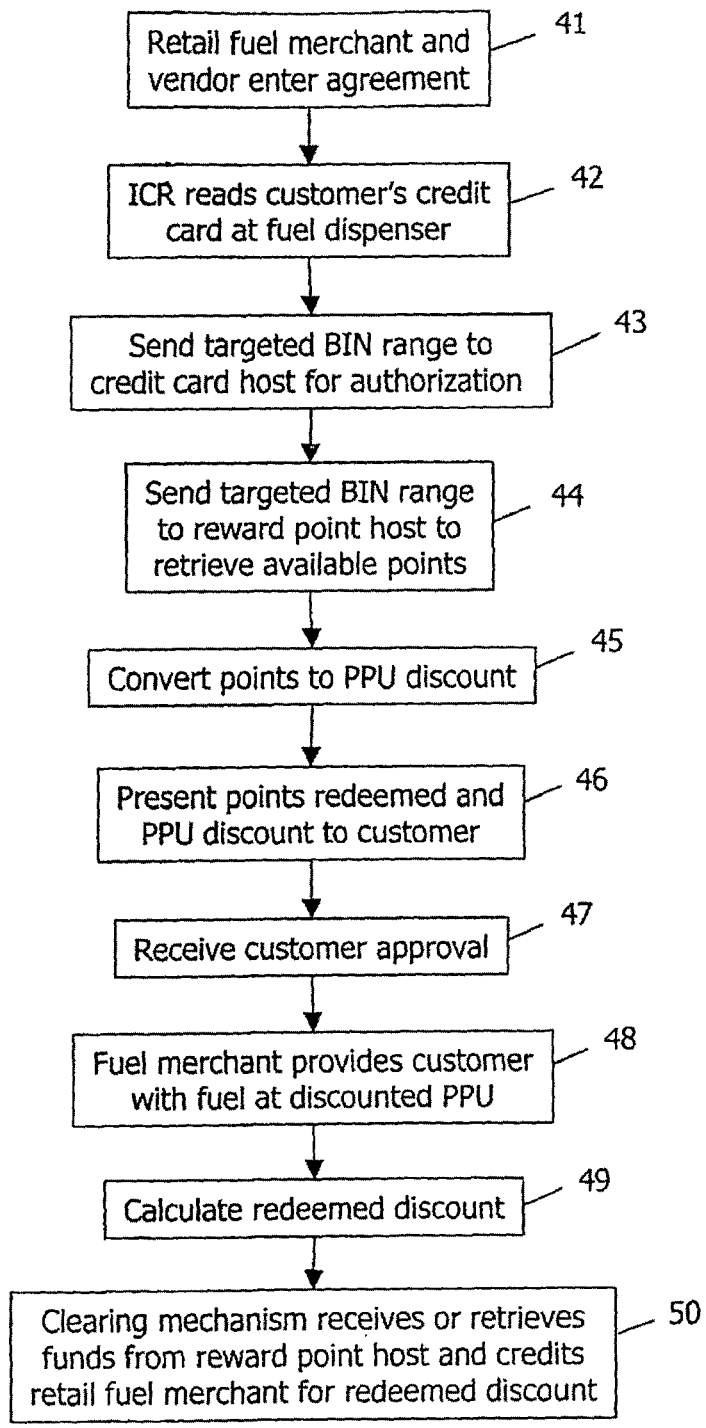
FIG. 4 is a flow chart illustrating the steps of a third embodiment of the method of the present invention.

FIG. 4 is a flow chart illustrating the steps of a third embodiment of the method of the present invention. In this embodiment, reward points are again exchanged for a PPU discount on fuel, but the customer is given real-time access to his reward point totals. At step 41, the retail fuel merchant and a vendor having a reward or loyalty point program enter an agreement, which allows reward points to be redeemed for PPU discounts on fuel. A customer participating in the program then initiates a fuel purchase at one of the retail fuel merchant's fueling stations. At step 42, the ICR in the dispenser reads the customer's credit card. At step 43, a targeted BIN range is sent to the credit card host for authorization processing as known in the art. At step 44, a targeted BIN range identifying the customer is sent to a reward points host to retrieve information regarding the number of reward points in the customer's account available for exchange. At step 45, the available points are converted to a PPU discount amount based on a negotiated exchange rate.

At step 46, the number of points to be redeemed and the resulting PPU discount are presented to the customer for approval. If the customer has a large number of points in his account, several levels of redemption/PPU discounts may be presented, and the customer may select which level he desires to apply to this fueling transaction. At step 47, the customer's approval is received, and at step 48, the retail fuel merchant provides the customer with fuel at a price discounted by the amount of the approved PPU discount. When the fueling transaction is complete, the redeemed discount is calculated at step 49. At step 50, a clearing mechanism transfers funds for the amount of the redeemed discount from the reward point host to the retail fuel merchant.

Thus, the invention enables a customer to exchange reward or loyalty points for a PPU discount, such as a cents-off-per-gallon discount, on fuel at the retail fuel merchant's fueling stations. The retail fuel merchant receives the posted street price for the fueling transaction because the reward point host pays the discount. The reward point host benefits because customers are motivated to increase their reward point totals by shopping at the reward point host or purchasing the reward point host's products.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fuel pump configured to provide customers with real-time access to frequent flyer miles earned by the customers via participation in a rewards program operated by a rewards program host and to convert at least a portion of the frequent flyer miles into a price-per-unit (PPU) of fuel during fueling transactions initiated by the customers at a fuel merchant, the fuel pump comprising:
    a financial card reader configured to read information from a financial card inserted into the financial card reader during a fueling transaction initiated by a customer associated with the financial card, wherein the information read from the financial card includes at least a financial card number;
    a fuel dispenser; and
    a controller configured to perform operations for real-time conversion of frequent flyer miles to PPU discounts during fueling transactions, wherein the operations comprise:
        transmitting a message requesting information that indicates a number of frequent flyer miles available for redemption by the customer to a system operated by the rewards program host, wherein the request includes at least a portion of the financial card number, and wherein the rewards program host determines an identity of the customer based on at least the portion of the financial card number included in the request; and
        receiving, from the system operated by the rewards program host, the information that indicates the number of frequent flyer miles available for redemption by the customer;
        determining, based upon an exchange rate for converting frequent flyer miles to a PPU discount, whether the number of frequent flyer miles available for redemption satisfies a first threshold number of frequent flyer miles, the first threshold number of frequent flyer miles corresponding to a first PPU discount, wherein the exchange rate is specified by an agreement between the fuel merchant and the rewards program host;
        determining, based upon the exchange rate for converting frequent flyer miles to a PPU discount, whether the number of frequent flyer miles available for redemption satisfies a second threshold number of frequent flyer miles, the second threshold number of frequent flyer miles corresponding to a second PPU discount that provides a higher PPU discount than the first PPU discount;
        in response to a determination that the number of frequent flyer miles available for redemption satisfies the first threshold number of frequent flyer miles, presenting first information that indicates the first PPU discount for fuel is available to the customer by redeeming a first portion of the frequent flyer miles available for redemption, the first portion of the frequent flyer miles corresponding to the first threshold number of frequent flyer miles;
        in response to a determination that the number of frequent flyer miles available for redemption satisfies the second threshold number of frequent flyer miles, presenting both the first information and second information, wherein the second information indicates the second PPU discount for the fuel is available to the customer by redeeming a second portion of the frequent flyer miles available for redemption, the second portion of the frequent flyer miles corresponding to the second threshold number of frequent flyer miles, wherein the second portion of the frequent flyer miles available for redemption is greater than the first portion of the frequent flyer miles available for redemption;
        receiving an input indicating an authorization to redeem one of the first portion of the frequent flyer miles in exchange for the first PPU discount and the second portion of the frequent flyer miles in exchange for the second PPU discount;
        when the input indicates the authorization to redeem the first portion of the frequent flyer miles:
            reducing a price of fuel posted on the fuel pump by the first PPU discount to produce a first discounted price for the fuel; and
            causing the fuel dispenser to dispense the fuel to the customer at the first discounted price;
        when the input indicates the authorization to redeem the second portion of the frequent flyer miles:
            reducing the price of fuel posted on the fuel pump by the second PPU discount to produce a second discounted price for the fuel; and
            causing the fuel dispenser to dispense the fuel to the customer at the second discounted price.

2. The fuel pump of claim 1, further comprising a redeemed discounts calculator configured to:

calculate a redeemed discount by multiplying a PPU discount for fuel by a number of units of fuel purchased in the fueling transaction, wherein the PPU discount for fuel is one of the first PPU discount and the second PPU discount, wherein a cash value equal to the redeemed discount is credited to an account associated with the fuel merchant.

3. The fuel pump of claim 2, wherein the controller is configured to initiate transmission of information indicating a number of frequent flyer miles redeemed during the fueling transaction to the rewards program host.

4. The fuel pump of claim 1, wherein the controller is configured to initiate transmission of information indicating a number of frequent flyer miles redeemed during the fueling transaction to the rewards program host.

5. The fuel pump of claim 1, wherein the financial card reader includes a magnetic card reader, a radio frequency identification (RFID) controller, a contactless smart card reader, an audio recognition device, a biometric recognition device, an optical reader, or a combination thereof.

\* \* \* \* \*